June 2, 1964 L. H. JOHNSTON, JR., ETAL 3,135,558
WHEEL BOLT COVER ASSEMBLY
Filed Nov. 27, 1962
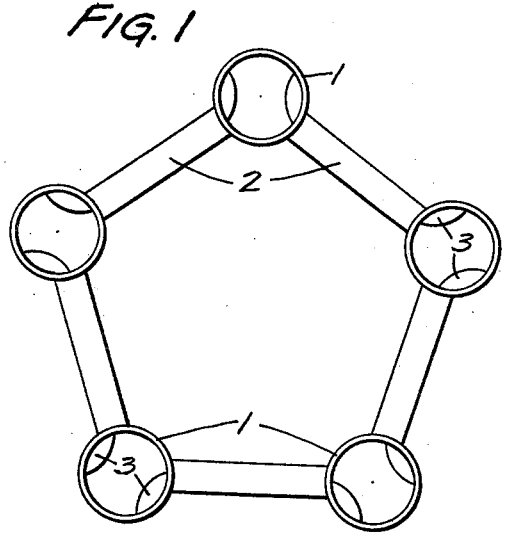
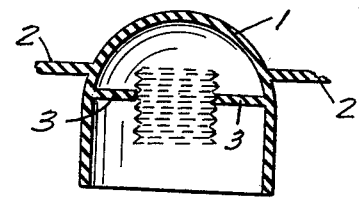
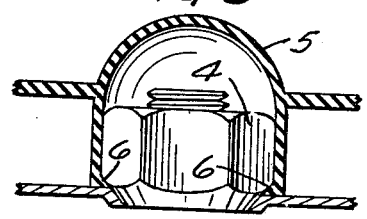
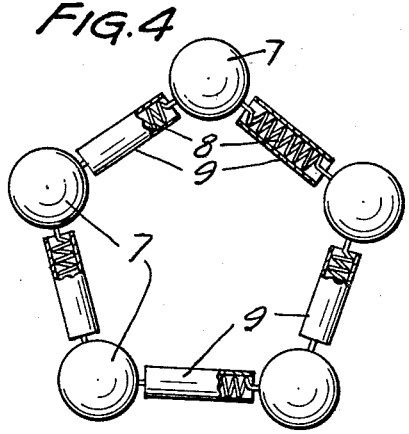
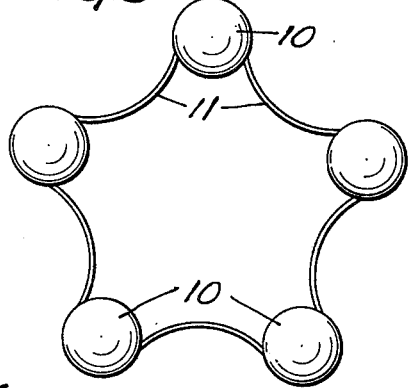
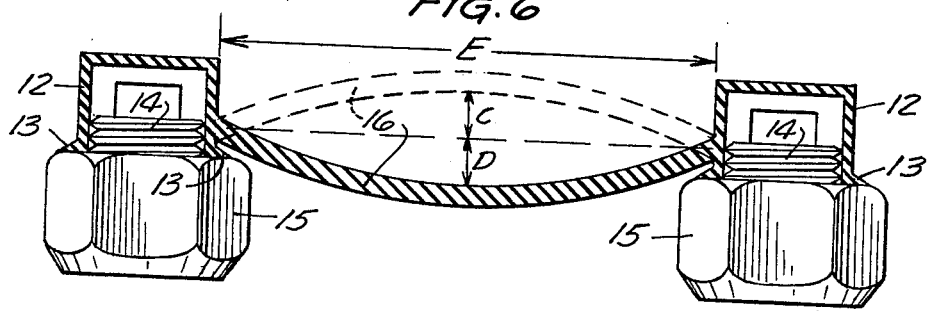
INVENTORS
LEONARD H. JOHNSTON, JR
VERNON W. STROM
BY James A. Smith
ATTORNEY United States Patent Office 3,135,558
Patented June 2, 1964

3,135,558
WHEEL BOLT COVER ASSEMBLY
Leonard H. Johnston, Jr., and Vernor W. Strom, Tamarack, Minn. (both of 2076 Como Ave., St. Paul 8, Minn.)
Filed Nov. 27, 1962, Ser. No. 240,234
6 Claims. (Cl. 301—37)

This invention relates to a readily removable protective cover assembly to shield exposed nuts and bolt ends on vehicular wheels.

In ordinary usage, most land vehicles require removal of their wheels for repair, tire replacement, and the many other maintenance services commonly associated with their optimum performance. Because most wheels are mounted over bolts having threaded ends and are secured thereon with nuts, the exposed threaded bolt ends are frequently subjected to considerable abuse. Dirt and various other foreign particles become embedded in the threads. Rust and corrosion build up deposits that cause "binding," greatly increasing the difficulty of removing the wheel nuts. In addition, the exposed threaded areas are also subjected to physical damage. With dual truck and trailer wheel assemblies, particularly those assemblies utilizing Budd wheel nuts, wheel removal is difficult and frequently impossible without the use of special tools, such as an acetylene torch, impact tools or other equipment not available on the vehicle for roadside emergencies. Although hub caps and protective discs are commonly used on private automobiles, they are readily damaged, and relatively expensive and inconvenient to use; moreover, they tend to restrict the circulation of cooling air in and around the brake drums. Such hub caps and protective discs have not therefore been generally used on dual truck and heavy duty trailer wheels.

It is therefore an object of this invention to provide a simple, readily removable protective cover assembly for shielding exposed nuts and bolt ends on vehicular wheels.

Still another object of this invention is to provide an attractive and inexpensive protective cover assembly for vehicular wheels which does not restrict the air flow in and around the wheel.

Yet another object of this invention is to provide a protective cover assembly for vehicular wheels which is a unitary structure and which can be quickly and easily installed and removed without screwing.

A further object of this invention is to provide a protective cover assembly for vehicular wheels which does not obstruct visual inspection of wheel nuts.

Another object of this invention is to provide a protective cover assembly for vehicular wheels which permits retention of a lubricant on the threaded portion of the wheel bolts to facilitate easy removal of the wheel nuts.

Other objects and advantages will be apparent from the figures and the following description.

The readily removable protective cover assembly of this invention for shielding exposed threaded bolt ends on a vehicular wheel comprises at least three, preferably five or six, cap members disposed in a circular array, connecting means between each of the cap members to form a unitary structure, and gripping means associated with each cap member to permit gripping a threaded bolt end therein without screwing. As used herein, "exposed threaded bolt end" refers to that portion of the wheel bolt extending outwardly from the wheel disc. If the cap member covers the threaded wheel nut, when installed the lip of the cap bears against the wheel disc. If the cap member covers only that portion of the exposed threaded bolt end extending outwardly from the threaded wheel nut, when installed the lip of the cap bears against the outer face of the threaded wheel nut.

Five or six unthreaded cap members are preferably employed when the protective assembly of this invention is used with present commercial trucks and automobiles. However, it is also possible to use two separate assemblies with three caps in each assembly for a wheel having six exposed threaded bolt ends. The caps in the assembly are disposed in a generally circular array to correspond to the circular array of conventional wheel bolts, as shown in FIGURE 1. If desired, an appropriate sealing member may be carried by the lip of the cap (as shown by 13 in FIGURE 6).

Although individual caps could be employed to achieve the desired protection of the exposed threaded wheel bolt ends, several disadvantages, including considerable inconvenience in installation, are incurred. In severe use, individual protective caps are generally more subject to accidental removal upon being struck a blow. Furthermore, over a period of extended use, individual caps tend to lose their gripping power and are eventually thrown by centrifugal force from the bolt end. By providing a unitary assembly of cap members, the useful life of the individual caps therein is considerably extended, and the installation and removal of the caps is greatly facilitated. The protective assembly of this invention, in which the cap members are disposed in a generally circular array by connective means, e.g. metal, rubber or plastic strips or tubes, springs, etc., therefore constitutes a significant improvement over the use of individual protective caps, and the latter thus is not considered to be a part of this invention.

In the unitary assembly of this invention the cap members are not screwed onto the exposed threaded wheel bolt ends but are provided with various other means for effecting positive retention of the cap members thereon, all of which may be characterized as "biasing means." The biasing means may be associated with the connectors between the individual caps or it may be integrated into the caps themselves. In either embodiment, however, the cap is "locked" onto the exposed threaded wheel bolt end by pressural means and can be manually inserted onto and removed from its installed position by the operator of the vehicle without special tools.

FIGURE 1 shows a five cap array in which the cap members 1 are joined by connector strips 2.

FIGURE 2 is a vertical cross section of one of the cap members of FIGURE 1 showing the biasing means which consists of two resilient projections 3 (e.g. spring clip, rubber bead, detent means, etc.) which engage the wheel nut or wheel bolt threads.

FIGURE 3 is a vertical cross section of another type of cap member showing the cap portion 5 having an inward projection or bead 6 about the lip of the cap. This inward projection 6, which may constitute an extension of the cap wall or may be a resilient ring affixed to the interior cap wall adjacent the lip, effects a positive locking action over the beveled end of wheel nut 4, much in the manner of a detent. If the inward projection 6 is made of a non-resilient material, the wall of cap 5 may be used to provide spring action to bias this projection 6 into its locked position.

FIGURES 4 and 5 illustrate the use of the connecting members as the biasing means. In FIGURE 4 spiral springs 8 are contained in tubular housing 9 and connect caps 7. If the diameter of the circular array of cap members 7 is made somewhat larger than the diameter of the circular array of wheel bolts, the assembly is maintained in its installed position by the expansive force of the springs. Conversely, if the diameter of the circular array of cap members is made somewhat smaller than the diameter of the circular array of wheel bolts, the assembly is retained in its installed position by the compressive force of the springs. The embodiment shown in FIGURE 5 operates in similar fashion, the springs 11 being single curved strips of spring steel connecting the cap members 10.

A particularly preferred embodiment of this invention is shown in FIGURE 6. Cap members 12 are connected by a normally bowed, invertible connector strip 16. Connector strip 16 is normally bowed as shown in broken lines. After the caps 12 are in position over the wheel bolt ends, as shown, the flexible connector strip is pressed inward toward the wheel disc, thereby inverting the connector strip as shown in heavy lines. The spring return action of connector strip 16 effects an outward pressure on adjacent caps 12 as it is partially returned, without inverting, toward the normal position, thereby locking the assembly in place over the wheel bolts. The original bow height above the connecting plane, i.e. C in FIGURE 6, is preferably of sufficient magnitude to provide a considerable inverted bow distance from the connecting plane, i.e. D in FIGURE 6. Usually, the ratio of the original bow height C to the distance between cap walls E should be at least about 0.1, although the material of construction and the physical dimensions of the connector strip 16 will influence the desirable original bow height. Such connector strips can be made of any relatively rigid material having flex properties, e.g. metal, plastic, etc. In actual use, this assembly is positioned with the caps 12 covering the exposed threaded wheel bolt ends 14 and in contact with the wheel nuts 15. A seal member 13 may be carried by the lip of cap member 12. When the connector strips are depressed from their normal to their inverted bowed position, cap assembly is locked into position. Simple removal requires only the manual return of the connector strips to their original bowed position. Because most effective operation is achieved when the cap members are also fabricated from a material that has some flex properties, the entire assembly may be attractively, easily and inexpensively made from one material, e.g. steel, plastic, etc. A transparent plastic material is particularly preferred when quick visual inspection of wheel nuts is desired without removal of the protective assembly. Moreover, the cap members can be used to retain a lubricant on the threaded portions of the wheel bolts to facilitate easy removal of the wheel nuts.

Various other embodiments of the present invention will be apparent to those skilled in the art without departing from the spirit and scope thereof.

What is claimed is:

1. A readily removable, integral protective cover assembly to shield exposed threaded bolt ends on a vehicular wheel which comprises at least five unthreaded cap members disposed in a circular array, connecting means between each of said adjacent cap members to maintain an integral structure, and means for frictional retention of said cap members on said exposed threaded bolt ends, said means for frictional retention permitting rapid insertion and removal of said cap members without screwing.

2. A readily removable, unitary protective cover assembly to shield exposed threaded bolt ends on a vehicular wheel which comprises at least five cap members disposed in a circular array, and spring means connecting each of said adjacent cap members for frictional retention of said cap members on said exposed threaded bolt ends.

3. A readily removable, integral protective cover assembly to shield exposed threaded bolt ends on a vehicular wheel which comprises at least five cap members disposed in a circular array, connecting means between each of said adjacent cap members to maintain an integral structure, and a resilient member in the interior of each of said cap members for frictional retention of said cap members on said exposed threaded bolt ends.

4. A readily removable, unitary protective cover assembly to shield exposed threaded bolt ends on a vehicular wheel which comprises at least five cap members disposed in a circular array, and a normally bowed, flexible, invertible connection member attached to and joining each of said adjacent cap members to provide for frictional retention of said cap members on said exposed threaded bolt ends.

5. The protective cover assembly of claim 1 in which each of said cap members contains a sealing means disposed about the lip portion thereof.

6. A readily removable, unitary protective cover assembly to shield exposed threaded bolt ends on a vehicular wheel which comprises at least five cap members disposed in a circular array, and extensible and contractible connecting means between each of said adjacent cap members for frictional retention of said cap members on said exposed threaded bolt ends.

References Cited in the file of this patent

UNITED STATES PATENTS

| | | |
|---|---|---|
| 1,727,590 | Ferry | Sept. 10, 1929 |
| 2,095,289 | Rosenberg | Oct. 12, 1937 |
| 2,252,194 | Mills | Aug. 12, 1941 |
| 2,456,234 | Young | Dec. 14, 1948 |
| 2,726,009 | Murdock | Dec. 6, 1955 |
| 2,949,204 | Edwards | Aug. 16, 1960 |
| 3,014,614 | Carroll et al. | Dec. 26, 1961 |